(12) United States Patent
O'Sullivan, Jr. et al.

(10) Patent No.: US 9,671,231 B2
(45) Date of Patent: Jun. 6, 2017

(54) MONITORING SYSTEM AND METHOD FOR VESSEL MOORING

(71) Applicant: TECHNIP FRANCE, Courbevoie (FR)

(72) Inventors: James Francis O'Sullivan, Jr., Houston, TX (US); Nicolas Tcherniguin, Paris (FR)

(73) Assignee: TECHNIP FRANCE, Courbevoie (FR)

( * ) Notice: Subject to any disclaimer, the term of this patent is extended or adjusted under 35 U.S.C. 154(b) by 183 days.

(21) Appl. No.: 14/803,785

(22) Filed: Jul. 20, 2015

(65) Prior Publication Data

US 2017/0023366 A1    Jan. 26, 2017

(51) Int. Cl.
*G01C 21/20* (2006.01)
*G01S 19/42* (2010.01)
(Continued)

(52) U.S. Cl.
CPC .............. *G01C 21/20* (2013.01); *B63B 21/50* (2013.01); *G01S 19/42* (2013.01); *B63B 21/00* (2013.01);
(Continued)

(58) Field of Classification Search
CPC ....... B63B 21/00; B63B 21/50; B63B 21/502; B63B 21/507; B63B 22/04;
(Continued)

(56) References Cited

U.S. PATENT DOCUMENTS 3,913,396 A * 10/1975 Elliot ................. G01L 5/103
                                                114/230.21
5,222,453 A    6/1993 Chabot
(Continued)

FOREIGN PATENT DOCUMENTS

WO    9954198 A1    10/1999

OTHER PUBLICATIONS

International Search Report and Written Opinion of the International Searching Authority, International Application No. PCT/US2016/042214, mailed Oct. 13, 2016.
(Continued)

*Primary Examiner* — Thomas G Black
*Assistant Examiner* — Sara Lewandroski
(74) *Attorney, Agent, or Firm* — Jackson Walker L.L.P.

(57) ABSTRACT

The present disclosure provides a system and method of monitoring a mooring system for a floating vessel using the time of the natural period independent of environmental conditions. The natural period can be calculated and/or established experientially over time by measuring movement of the vessel to establish the natural period at given geographical positions of a secure and intact mooring system. The natural period can be monitored based on the time to complete a natural period. A change in a mooring line stiffness, whether by a failure, stretching, a degradation of the mooring line integrity, or a significant displacement of the anchoring point, will be translated into a different natural period with a different time. By monitoring the natural period for a given geographical position (and corresponding heading) to be compared to the theoretical values (and/or previous recorded values) it is then possible to assess that at least a portion of the mooring system has failed or that a significant damage has occurred.

14 Claims, 6 Drawing Sheets

(51) Int. Cl.
  *B63B 21/50* (2006.01)
  *B63B 21/00* (2006.01)
(52) U.S. Cl.
  CPC ... *B63B 2021/003* (2013.01); *B63B 2021/008* (2013.01); *B63B 2021/009* (2013.01)
(58) Field of Classification Search
  CPC ........ B63B 2021/505; B63B 2021/003; B63B 2021/007; B63B 2021/008; B63B 2021/009
  See application file for complete search history.

(56) References Cited

U.S. PATENT DOCUMENTS

| | | | | |
|---|---|---|---|---|
| 5,506,588 | A * | 4/1996 | Diefes | G01C 21/00 342/357.27 |
| 7,034,680 | B2 * | 4/2006 | Grunder | B63B 21/00 340/531 |
| 9,261,880 | B2 * | 2/2016 | Seo | G05D 1/0208 |
| 2006/0207488 | A1 * | 9/2006 | Haas | B63B 21/22 114/267 |
| 2009/0084302 | A1 | 4/2009 | Daran et al. | |
| 2009/0115622 | A1 * | 5/2009 | Michie | B63B 21/22 340/686.1 |
| 2010/0186652 | A1 * | 7/2010 | Martin | B63B 21/00 114/230.1 |
| 2013/0239649 | A1 * | 9/2013 | Jamieson | B63B 21/00 73/1.15 |
| 2014/0338581 | A1 * | 11/2014 | Gill | B63B 21/04 114/230.21 |
| 2015/0017849 | A1 * | 1/2015 | Knezek | B63B 22/02 441/3 |
| 2015/0246711 | A1 * | 9/2015 | Lee | B63B 21/50 405/224 |

OTHER PUBLICATIONS

Magee et al., Mooring Design for Directional Spar Hull VIV, OTC 15243; 2003 Offshore Technology Conference held in Houston, Texas, U.S.A., May 5-8, 2003.

* cited by examiner

| Table 2-1 Typical Natural Periods of Deep Water Floaters | | | | |
|---|---|---|---|---|
| | Natural Periods (Seconds) | | | |
| Floater Mode | FPSO | DDF | TLP | Semi |
| Surge | >100 | >100 | >100 | >100 |
| Sway | >100 | >100 | >100 | >100 |
| Heave | 5-12 | 20-35 | <5 | 20-50 |
| Roll | 5-30 | 50-90 | <5 | 30-60 |
| Pitch | 5-12 | 50-90 | <5 | 30-60 |
| Yaw | >100 | >100 | >100 | >100 |

MONITORING SYSTEM AND METHOD FOR VESSEL MOORING

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to the mooring systems for floating vessels. Specifically, the disclosure relates to the monitoring the condition of mooring systems of floating vessels, including offshore platforms.

Description of the Related Art

In the field of offshore oil and gas production, a moored vessel may be used as a floating drilling and/or production unit (FPU). Typically, an FPU is moored to the sea bed by means of multiple mooring lines attached to anchors, which may typically be pile anchors, suction anchors, or self-burying anchors of conventional type and which maintain the FPU in a desired location. Other vessels, such as offshore floating platforms including Spars, semi-submersible, and other platforms can also be similarly moored. The mooring line system can be a Taut or Semi-Taut or Taut Catenary or pure Catenary system.

An example of a typical mooring system for a Spar is illustrated in FIG. 1. FIG. 1 is schematic side view of a typical mooring system used for a floating vessel. FIG. 2 is a schematic top view of the typical mooring system with the floating vessel. The vessel 2 is held in a relative stable position while being allowed to float and move with the currents through a mooring system 4. A plurality of mooring lines 6 is stretched radially outwardly to a sea bed 8 and held at a mooring point 11 (such as an eye or other attachment means) on a pile or other anchoring device 10. Multiple mooring lines can extend from a given side and most often extend in multiple directions from the vessel as shown particularly in FIG. 2.

It is important that the mooring system is monitored in order to determine whether a line has been damaged, come loose from its anchoring point on the sea bed, or if the anchoring points have moved. If a single mooring line or its anchoring point is damaged in this way, the effect on the position of the vessel may not be particularly noticeable, but such damage must be recognised early in order that remedial action can be taken before further damage may allow the vessel to break free from its moorings and/or generate damage to the riser/export systems that are crucial to the production.

Historically, a typical mooring system failure is discovered during inspection by a diver or ROV. Some systems monitor the integrity of the mooring lines by a load cell or a compressive cell located either on the mooring line or on guiding/supporting equipment or at the tensioning system, by installing an inclinometer along the mooring line, or by installing a sonar deployed beneath the vessel. Such monitoring systems are expensive, complicated to install and maintain, and vulnerable to damage considering that they are installed underwater or close to water.

A further alternative for monitoring mooring systems is shown in US Publication No. 2010/0186652. The abstract states that the method of monitoring a vessel mooring system involves determining the geographical position of a locating point on the vessel remote from the mooring point and determining the heading of the vessel. The geographical position of the mooring point is then calculated from the determined position of the locating point and the vessel heading. The position of the mooring point is compared to at least one expected position of the mooring point, in order to provide an indication of failure of a mooring line or anchor. Because the geographical position varies with environmental conditions such as current flow and direction, wind speed and direction, and so forth, the geographical location by itself related to monitoring a mooring system would appear to have limited accuracy.

Vessels have their natural period in sway and surge (horizontal displacement) mainly linked to the stiffness of their mooring system. The mooring system causes the sway natural period to vary as a function of direction (that is, "heading"). FIG. 3 illustrates typical natural periods for various vessels that are deep water floating vessels, namely, a floating production storage and offloading (FPSO), deep draft floater (DDF, such as Spars), tension leg platforms (TLP), and semi-submersibles (Semi) in different modes of movement. The typical presence of risers, such as riser 12 in FIG. 2, results in an unsymmetrical inclination of the vessel to sway in the natural period with some directional dependence at a lower order.

A paper entitled "Mooring Design for Directional Spar Hull VIV" published at the Offshore Technology Conference in 2003 in Houston, Tex. as OTC 15243-MS (available at https://www.onepetro.org/conference-paper/OTC-15243-MS) discusses the effect of vortex induced vibrations (VIV) on a Spar mooring system when the Spar is fitted with helical strakes around the outer surface of the submerged hull and the effect on the natural period. The article discusses on page 2 one methodology of calculating Spar offsets due to imposed environmental current load and direction and drag loads due to hull VIV. The Spar sway natural period is determined based on the calculated offset and the mooring stiffness, and varies depending on whether the sway is in-line or out-of-line with the mooring lines. FIG. 4 shows variations of natural periods as a function of current speed and direction for a typical mooring system shown in FIG. 2. The mooring system can be a typical four direction, four mooring lines per direction (4×4) mooring configuration, illustrated in FIG. 2. The sway natural period (Tn) is normalized by the sway period at zero offset (Tno). The current speed varies from no current to a maximum design current. FIG. 5 illustrates variations in offsets with current velocity and heading. Variations due to the effects of the mooring restoring are shown in the directional behaviour of the offsets. In addition to the above paper not teaching monitoring mooring systems for degradation, the above paper aspects of natural periods but, like US Publication No. 2010/0186652, requires environmental factoring to achieve its results.

There remains then a need to provide more simplified yet predictable monitoring mooring system and method that can operate independently of factoring measurements for environmental conditions.

BRIEF SUMMARY OF THE INVENTION

The present disclosure provides a system and method of monitoring a mooring system for a floating vessel using the time of the natural period independent of environmental conditions. The natural period can be calculated and/or established experientially over time by measuring movement of the vessel to establish the natural period at given geographical positions of a secure and intact mooring system. The natural period can be monitored based on the time to complete a natural period. A change in a mooring line stiffness, whether by a failure, stretching, a degradation of the mooring line integrity, or a significant displacement of the anchoring point, will be translated into a different natural period with a different time. By monitoring the natural period for a given geographical position (and corresponding heading) to be compared to the theoretical values (and/or previous recorded values) it is then possible to assess that at least a portion of the mooring system has failed or that a significant damage has occurred.

The disclosure provides a method of monitoring for changes in a mooring system for a floating vessel, the mooring system having at least one mooring line coupled between the vessel and an anchor having a mooring point to which the at least one mooring line is coupled, the method comprising: determining and recording in time a geographical position of a locating point on the vessel to establish a baseline geographical position; determining and recording at least one type of an associated natural period of the vessel at the baseline geographical position to establish an associated baseline natural period; and comparing an operational geographical position and associated natural period to reference data of a baseline geographical position and associated baseline natural period corresponding to an undamaged mooring system to provide an indication of a change of the mooring line or the anchor.

The disclosure also provides a method of monitoring the mooring line stiffness shift, mooring line material creeping of a moored vessel, or a combination thereof, the vessel having a mooring point to which the mooring line is connected, the method comprising: determining a geographical position and at least one type of an associated natural period of the vessel; and using a determined shift in the geographical position and associated natural period to determine the stiffness variation of the mooring lines.

The disclosure further provides a method of monitoring the riser/export system stiffness shift of a moored vessel having a mooring point to which the mooring line is connected, the method comprising: determining a geographical position and at least one type of an associated natural period of the vessel; using a determined shift in the geographical position and associated natural period to determine the stiffness variation of the riser/export system.

The disclosure also provides an system for monitoring for changes in a mooring system for a floating vessel, the mooring system having at least one mooring line coupled between the vessel and an anchor having a mooring point to which the at least one mooring line is coupled, the system comprising a satellite positioning device and a data processing system configured to: determine a geographical position of a locating point on the vessel from the satellite positioning device; determine at least one type of an associated natural period of the vessel at the given geographical position; and compare the geographical position of the vessel and its associated natural period to an expected set of data to indicated a change of the mooring line or the anchor.

DETAILED DESCRIPTION

Figure 1:
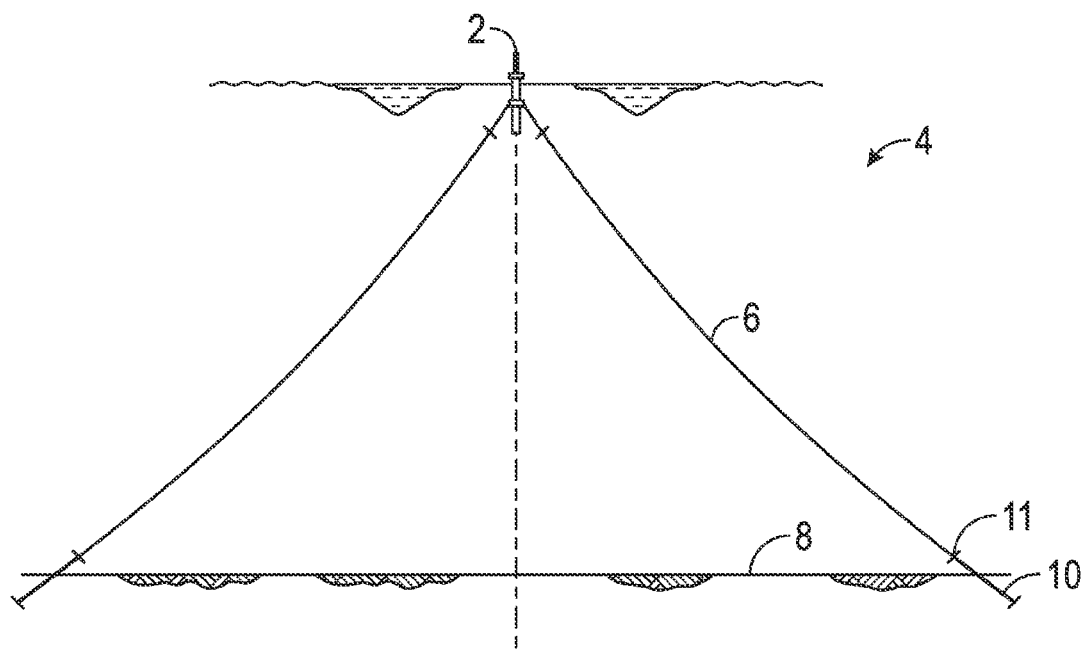
FIG. 1 is schematic side view of a typical mooring system used for a floating vessel.
Figure 2:
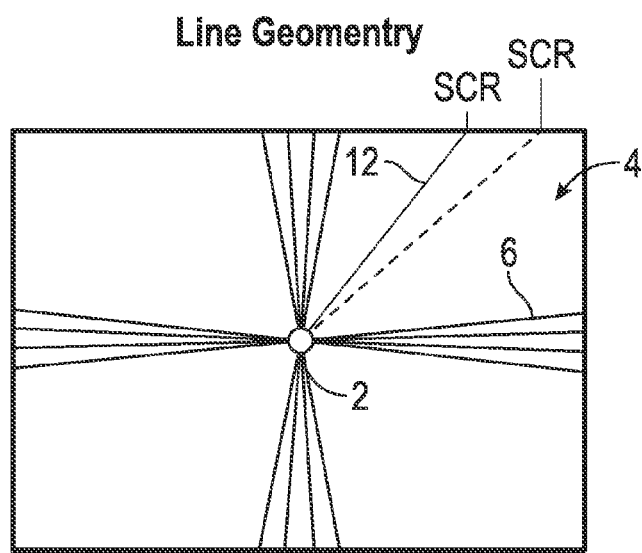
FIG. 2 is a schematic top view of the typical mooring system with the floating vessel.
Figures 3, 4:
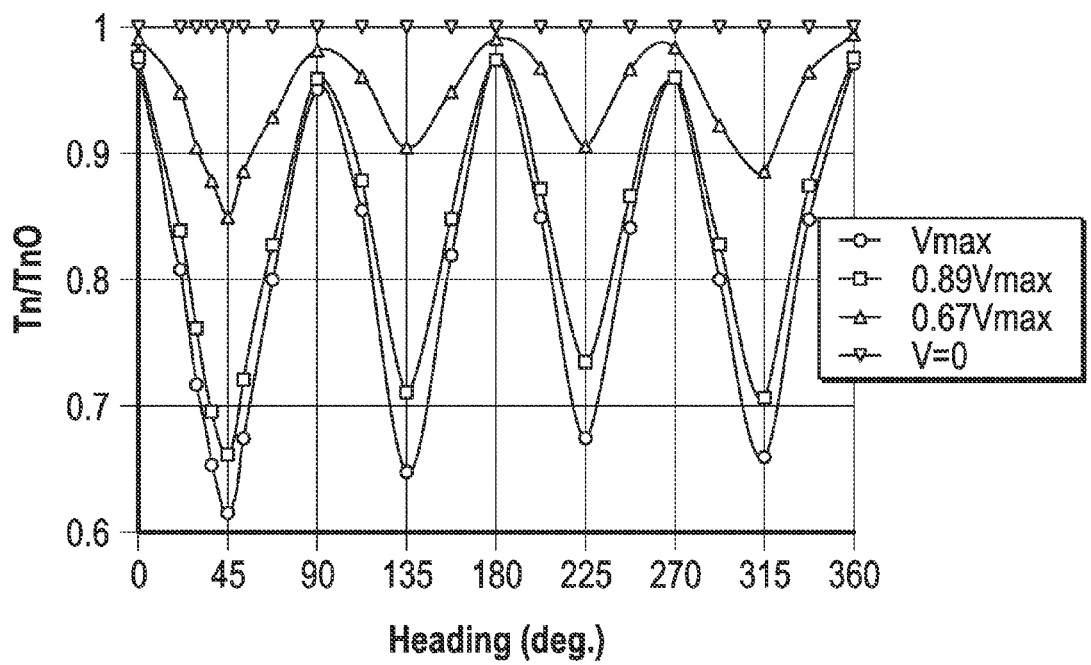
FIG. 3 illustrates typical natural periods for various vessels that are deep water floating vessels in different modes of movement.
FIG. 4 shows variations of natural periods as a function of current speed and direction for a typical mooring system shown in FIG. 2.
Figure 5:
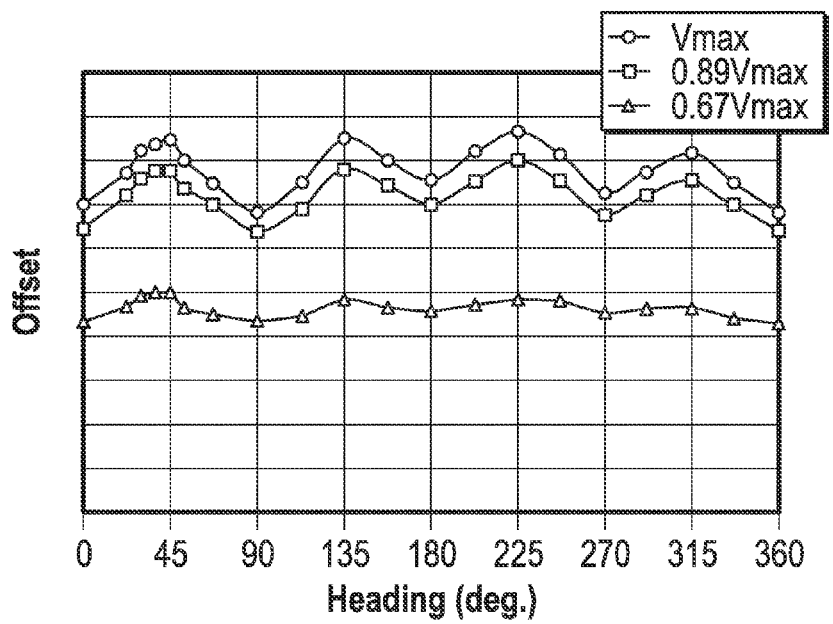
FIG. 5 illustrates variations in offsets with current velocity and heading.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter can be used. Further, such designations do not limit the number of members that can be used for that function.

The present disclosure provides a system and method of monitoring a mooring system for a floating vessel using the time of the natural period independent of environmental conditions. A baseline natural period can be calculated and/or established experientially over time by measuring geographical positions and directional movement of the vessel to establish at least one type of a natural period of a secure and intact mooring system and more generally a set of expected positions and associated periods of the vessel. The type of natural period can be, for example, sway, surge, and/or heave natural periods. The operational geographical position and natural period can be monitored and compared to the baseline geographical position and natural period or a set thereof. A variation in a mooring line stiffness, whether by a failure, stretching, a degradation of the mooring line integrity, or a significant displacement of the anchoring point, results in a different geographical position and natural period with a different time. By monitoring the geographical position and associated natural period for a given location (and corresponding heading) to be compared to the baseline values (and/or previous recorded values), it is then possible to assess that at least a portion of the mooring system has failed or that a significant damage has occurred. This comparison can be made independent of operational environmental conditions at the time the operational data is obtained in contrast to prior efforts. Further, the operational geographical position and natural period can be compared to reference data of damaged mooring systems to indicate the probable mooring line or anchor point that has become damaged or moved.

Figure 6:
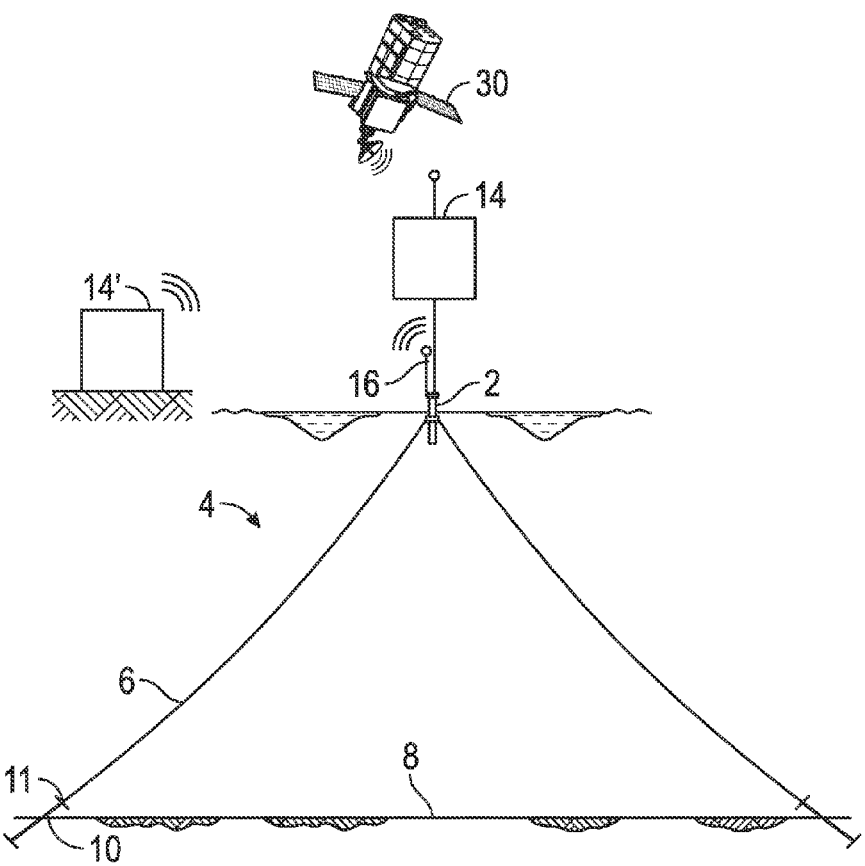
FIG. 6 is a schematic elevation view of an exemplary vessel coupled with a natural period monitoring system.
Figure 6A:
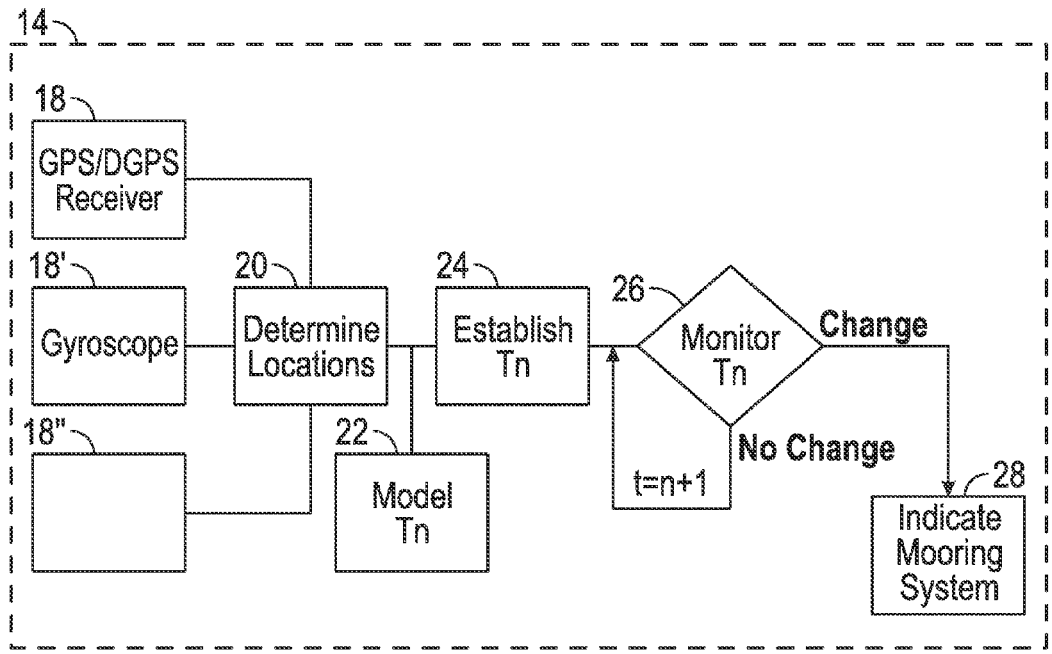
FIG. 6A is a flow chart of an exemplary method of using the natural period of the vessel to monitor a mooring system coupled to the vessel.

FIG. 6 is a schematic elevation view of an exemplary vessel coupled with a natural period monitoring system. FIG. 6A is a flow chart of an exemplary method of using the natural period of the vessel to monitor a mooring system coupled to the vessel. The vessel 2 is moored with a mooring system 4 having mooring lines 6 coupled to the sea bed 8 at the mooring points 11 of the anchoring devices 10 of various types (herein, "anchors"). The natural period monitoring system 14 can be coupled to the vessel 2. It is envisioned that the invention is a "dry" system, that is, the equipment can be located in the topside of the vessel above the water and sensitive equipment may be positioned for example on the bridge or in a control room, where the likelihood of damage is vastly reduced and maintenance easy to perform in comparison with systems located underwater or along the hull or on hull deck. Alternatively, one or more portions of the natural period monitoring system 14' can be located remotely from the vessel and can be in communication with the vessel for data, voice, and/or other transmission or receipt of information such as through an antenna 16, cable, laser, fiber, or other means to communicate.

It is possible, in real time, to assess whether the actual vessel location and associated natural period data are in-line with the expected (theoretical and/or previously recorded) reference data. The natural period monitoring system 14 can include processors, databases, and input and output means to process and respond to data regarding the natural period of the vessel. The system 14 can also include geographical position determining devices for establishing associated natural period(s) of the vessel. Typically, determinations of geographical positions can be made by means of satellite positioning systems, such as by use of the Global Positioning System (GPS) or Differential Global Positioning System (DGPS) 30. For example, a GPS or DGPS receiver 18 can be used to track the vessel geographical position at various times to establish an associated natural period at that position by analyzing the displacement of the vessel through its floating motion as a function of time. For example, the natural period can be related to sway, surge, and/or heave natural periods. A gyroscope 18' can be used to measure direction in addition to or in lieu of the GPS receiver 18. Other systems and devices 18" for measuring movement can be used to determine the associated natural period in step 20. Alternatively, the natural period can be theoretically modeled in step 22 using known formula and parameters of the vessel in step 22. Enhanced post processing can, after a period of time, replace the theoretical values by recorded actual values and therefore give a generally more accurate and realistic set of reference data of expected geographical positions with associated natural periods. The modeled information can be provided to establish the natural period, Tn, in step 24 in conjunction with, or in lieu thereof, the actual natural period determination the step 20. Once the natural period is established, then the system can monitor an operational natural period for a given geographical position periodically for any changes in step 26. If there are no changes, then the system indexes to monitor the system again at a later time. If there are changes in the natural period for the given geographical position in step 28, the system can indicate a change to a user and/or to a processor or another device for additional actions, including coupled the system to the vessel control/alarm system.

If it appears that the actual data is not corresponding with the expected data, it is then possible to indicate which mooring line or anchor has encountered a damage. The approximate indication of the mooring line or anchor may be achieved by comparing actual data with theoretical values computed using the vessel analytical model considering line failure cases (or actual values if available) for a damaged mooring system. In some systems, an automated change could be made on other mooring lines to re-establish the stiffness of the mooring system and thus re-establish the natural period prior to the change.

The invention is based on the analysis of the vessel natural period which is directly linked to the mechanical condition of the mooring lines (or anchors). In contrast, prior diagnostic systems that are based only on the analysis of the displacement of the vessel rely on the mechanical condition of the mooring lines, but also on the environmental condition. In some cases, a given displacement can be obtained (a) with all mooring lines and a given environmental condition, but the same displacement can apply to (b) a damaged mooring line and different environmental conditions. Therefore, a diagnostic based on the displacement of a moored vessel cannot be fully reliable. To be more reliable, it would need to also record simultaneously the environmental condition driving the vessel displacement (mainly wave and current) and then validate the correlation between the location (displacement) and the loading condition (environmental data). This dual need of the environmental conditions as well may necessitate the use of a metocean buoy close to the vessel that is costly to purchase and install, and costly to maintain in operation.

Beyond mooring line and anchor failure detection, the natural period monitoring system 14 can be used to indicate when stretching/creeping occurs such as when polymer mooring lines are used, and re-tensioning of one or more mooring lines is needed. For example, the comparison of the operational position of the vessel to the baseline position can include determining the distance of the mooring point on the vessel from the anchor points of the mooring lines. Similarly, the invention can be used to associated a change in the riser/export system stiffness. The monitoring system can also be used to estimate fatigue of vessel components.

Accurate recording of a vessel's geographical position with a variation around a mean position and corresponding heading allow through enhanced post processing using reference databases based on modeling to cumulate fatigue of vessel components directly affected by the motions of the vessel. This fatigue analysis enables determination of the actual fatigue consumption on a continuous basis and associated remaining life by the motion.

Figure 7:
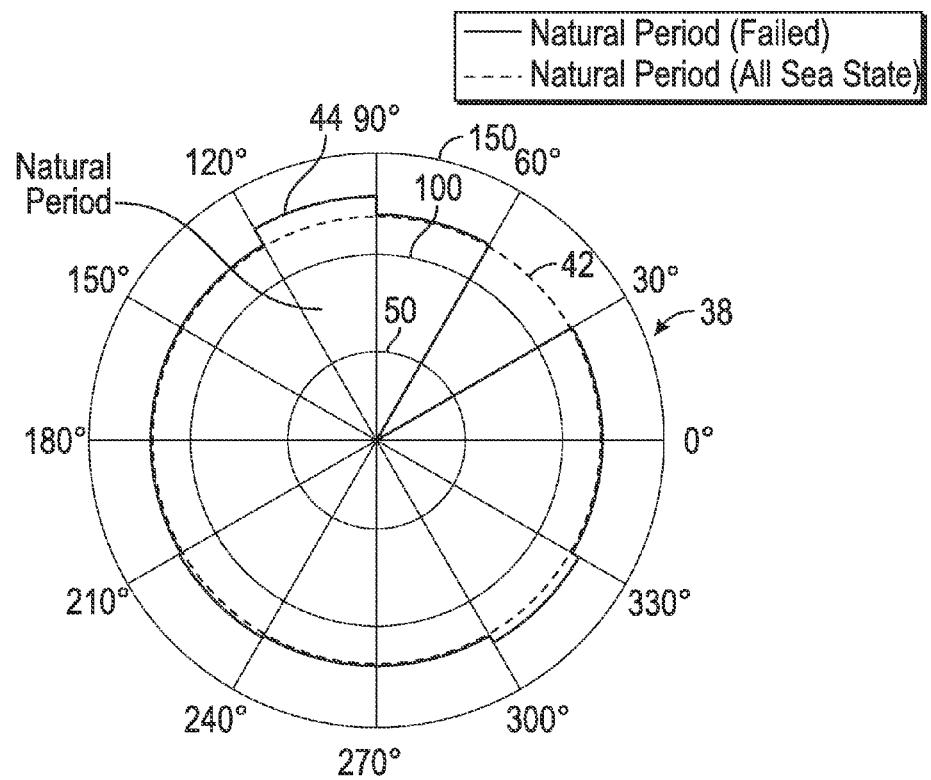
FIG. 7 is a schematic chart showing a plot of mean natural periods radially around the vessel with a change in one portion of the chart.

FIG. 7 is a schematic chart showing a plot of a comparison of operational natural periods radially around the vessel to baseline natural periods with a change shown in a portion of the chart. The chart 38 represents a comparison of the operational natural periods to the baseline natural periods in all sea states. The chart illustrates that the natural periods can be compared independent of environmental conditions. The dashed line 42 represents the mean baseline natural period in a given direction, which are almost the same around the 360 degrees. The solid line 44 represents the mean operational natural period in a given direction, which are almost the same as the baseline natural periods except in the range of about 90 to 120 degrees. From the chart, it can be concluded that the mooring tensions and therefore stiffness has changed (in this case, decreased) between about 270 to 300 degrees. Except for the 90 to 120 degrees change, the remainder of the operational natural periods and their comparison show little change in the mooring stiffness.

Figure 8:
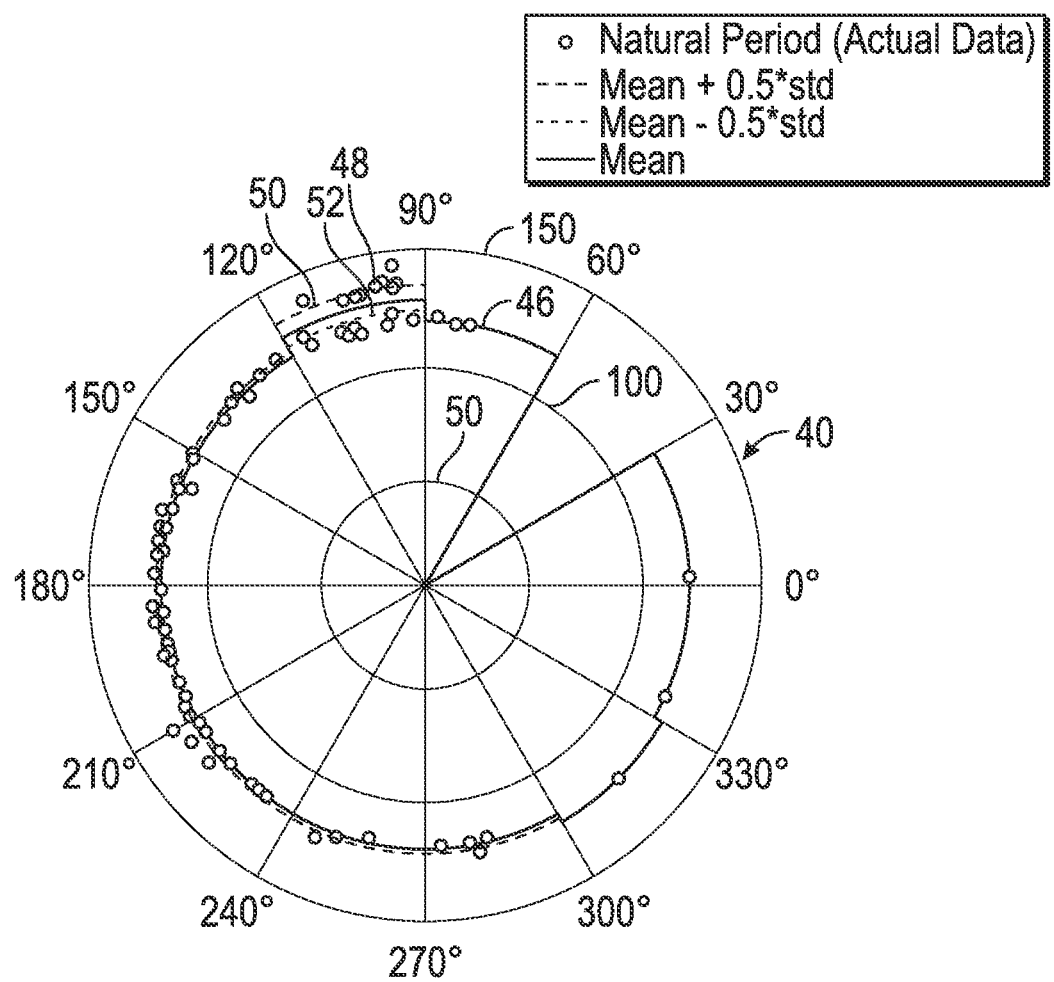
FIG. 8 is a schematic chart with additional details of the exemplary chart in FIG. 7.

FIG. 8 is a schematic chart showing a plot of the operational natural periods radially around the vessel to illustrate the actual operational data with mean data and variations. The chart 40 shows a mean operational natural period by a solid line 46. The actual data of the operational natural periods is shown by the various data points 48 illustrated on this chart. A mean with a plus 0.5 factor of the standard deviation is shown as a large dashed line 50, while the mean with a minus 0.5 factor of the standard deviation is shown in the small dashed line 52. The chart illustrates that the mean varies in the same angular area as in FIG. 7 of about 90 to 120 degrees.

Figure 9:
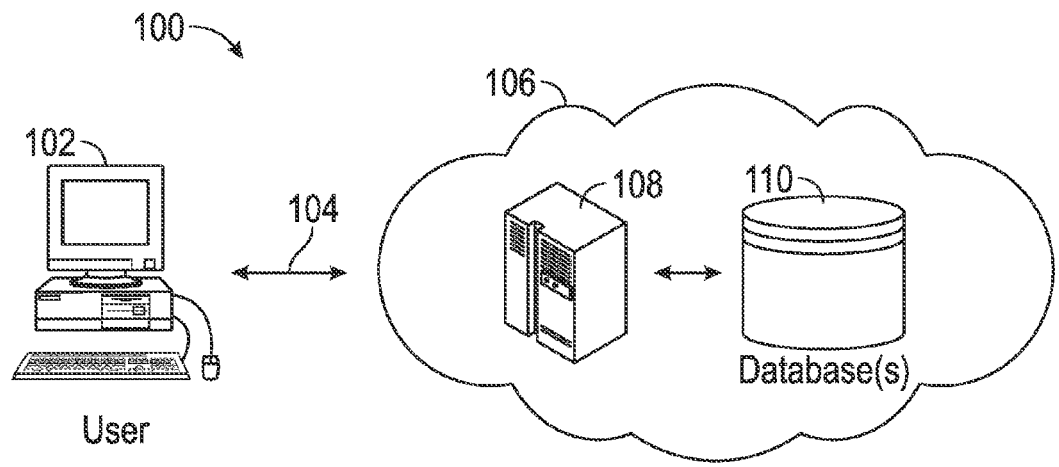
FIG. 9 illustrates an example of a computing system in which the steps for automatically determining the natural period and monitoring the natural period, according to the disclosed embodiments.

FIG. 9 illustrates an example of a data processing apparatus 100 in which the steps for automatically determining the natural periods and monitoring the natural periods, according to the disclosed embodiments. As can be seen, the system can include at least one user processing device 102 that can be connected via a network connection 104 to a network 106. In the present example, the user processing device 102 may be a desktop computer, notebook computer, tablet, smart phone, and other processing device, and the network connection 104 may be a wired and/or wireless network connection. Alternatively, the processing device 102 may be a stand-alone system that does not interface with a network or network servers. One or more network servers 108 may be connected to the network 106 with at least one database 110, which may be either an internal database that resides within the network servers 108, or a database that resides in a physically separate location from the network servers 108 (as shown here), depending on the constraints (e.g., size, speed, etc.) of the particular implementation. Note that the term "server" is used herein to include conventional servers, as well as high-end computers, workstations, mainframes, supercomputers, and the like. Similarly, the at least one database 110 may be a relational database, operational database, or other suitable database capable of storing data and information, including location information for determining the natural period and variations from the natural period.

Figure 10:
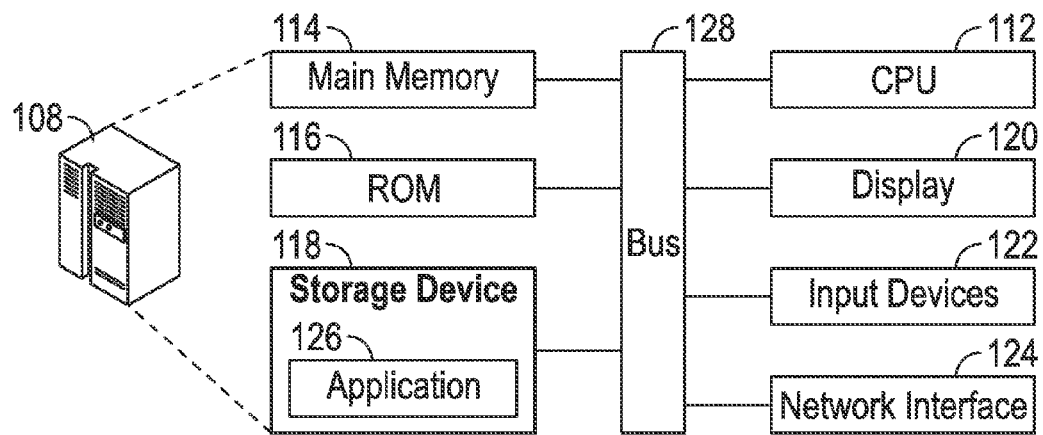
FIG. 10 illustrates an exemplary server that may be used as one of the one or more servers on the computing network.

FIG. 10 illustrates an exemplary server that may be used as one of the one or more servers 108 on the computing network 106. As mentioned earlier, this server 108 may be any suitable data processing system known to those having ordinary skill in the art, including a high-end server, workstation, mainframe, supercomputer, and the like. Such a server 108 typically includes a bus 128 or other communication mechanism for transferring information within the server 108, and a CPU 112 coupled with the bus 128 for processing the information. The server 108 may also include a main memory 114, such as a random access memory ("RAM") or other dynamic storage device coupled to the bus 128 for storing computer-readable instructions to be executed by the CPU 112. The main memory 114 may also be used for storing temporary variables or other intermediate information during execution of the instructions to be executed by the CPU 112. The server 108 may further include a read only memory ("ROM") 116 or other static storage device coupled to the bus 128 for storing static information and instructions for the CPU 112. A computer-readable storage device 118, such as a magnetic disk, optical disk, or solid state memory device, may be coupled to the bus 128 for storing information and instructions for the CPU 112.

The term "computer-readable instructions" as used above refers to any instructions that may be performed by the CPU 112 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 118. Volatile media may include dynamic memory, such as main memory 114. Transmission media may include coaxial cables, copper wire and fiber optics, including wires of the bus 128. Transmission itself may take the form of acoustic or light waves, such as those generated during radio frequency ("RF") and infrared ("IR") data communications. Common forms of computer-readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other medium from which a computer can read.

The CPU 112 may also be coupled via the bus 128 to a display 120 for displaying information to a user. One or more input devices 122, including alphanumeric and other keyboards, mouse, trackball, cursor direction keys, and so forth, may be coupled to the bus 128 for communicating information and command selections to the CPU 112. A network interface 124 provides two-way data communication between the server 108 and other computers over the network 106. In one example, the network interface 124 may be an integrated services digital network ("ISDN") card or a modem used to provide a data communication connection to a corresponding type of telephone line. As another example, the network interface 124 may be a local area network ("LAN") card used to provide a data communication connection to a compatible LAN. Wireless links may also be implemented via the network interface 124. In summary, the main function of the network interface 124 is to send and receive electrical, electromagnetic, optical, or other signals that carry digital data streams representing various types of information.

In accordance with the disclosed embodiments, an application 126 for determining and/or monitoring the natural period of the vessel, or rather the computer-readable instructions therefor, may also reside on the storage device 118. The computer-readable instructions for the application 116 may then be executed by the CPU 112 and/or other components of the server 108 to determine the natural period or monitor the compliance of the vessel with the natural period. Such an application 126 may be implemented using any suitable application development environment and programming language known to those having ordinary skill in the art to carry out the steps of the algorithms disclosed and described herein. As noted above, in various embodiments, the application 126 may be a stand-alone application that may be executed independent of other applications, or it may be in the form of a plugin module to an existing software package, and the like.

Other and further embodiments utilizing one or more aspects of the invention described above can be devised without departing from the spirit of Applicant's invention. For example, other types of geographical position determining devices, various equipment such as alarms, software for remote sensing, dedicated software linked to the vessel control/alarm system and the like can be used to enhance the operation and notification of the natural period monitoring system, along with other variations can occur in keeping within the scope of the claims.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A method of monitoring for changes in a mooring system for a floating vessel, the mooring system having at least one mooring line coupled between the vessel and an anchor having a mooring point to which the at least one mooring line is coupled, the method comprising:
   determining and recording in time a geographical position of a locating point on the vessel to establish a baseline geographical position;
   determining and recording at least one type of an associated natural period of the vessel at the baseline geographical position to establish an associated baseline natural period; and
   comparing an operational geographical position and associated natural period to reference data of a baseline geographical position and associated baseline natural period corresponding to an undamaged mooring system to provide an indication of a stiffness of the mooring line or a change of the anchor.

2. The method of claim 1, further comprising comparing the operational geographical position and associated natural period to reference data corresponding to a damaged mooring system to indicate the mooring line or anchor that has changed.

3. The method of claim 1, wherein at least one geographical position of the locating point is determined by means of a satellite positioning system.

4. The method of claim 1, further comprising comparing the operational geographical position and associated natural period to the baseline geographical position and associated baseline natural period independent of operational environmental conditions.

5. The method of claim 1, wherein the method further comprises:
   recording the geographical position and associated natural periods of the vessel over time in order to establish at least a portion of the reference data with a set of expected geographical positions and associated natural periods of the vessel; and
   comparing the operational geographical position and associated natural period to the set of expected geographical positions and associated natural periods of the vessel.

6. The method of claim 5, wherein the comparison of the operational geographical position of the vessel to an expected geographical position of the set includes measuring the excursion of the vessel from the expected geographical position.

7. The method of claim 5, wherein the comparison of the geographical position of the vessel to the expected geographical position includes measuring the period of time for which the mooring point has deviated from the expected geographical position.

8. The method of claim 1, wherein the comparison of the geographical position of the vessel to the expected geographical position includes determining the distance of the mooring point from the anchor points of the mooring lines.

9. The method of claim 1, further comprising recording geographical positions and associated natural periods of the vessel over time to cumulate fatigue of vessel components directly affected by motions of the vessel.

10. A data processing system configured to carry out the method of claim 1.

11. A computer software configured to provide instructions to a data processing apparatus to carry out the method of claim 1.

12. A method of monitoring the mooring line stiffness shift, mooring line material creeping of a moored vessel, or a combination thereof, the vessel having a mooring point to which the mooring line is connected, the method comprising:
determining a geographical position and at least one type of an associated natural period of the vessel; and
using a determined shift in the geographical position and associated natural period to determine the stiffness variation of the mooring lines.

13. A method of monitoring the riser/export system stiffness shift of a moored vessel having a mooring point to which the mooring line is connected, the method comprising:
determining a geographical position and at least one type of an associated natural period of the vessel; and
using a determined shift in the geographical position and associated natural period to determine the stiffness variation of the riser/export system.

14. A system for monitoring for changes in a mooring system for a floating vessel, the mooring system having at least one mooring line coupled between the vessel and an anchor having a mooring point to which the at least one mooring line is coupled, the system comprising a satellite positioning device and a data processing system configured to:
determine a geographical position of a locating point on the vessel from the satellite positioning device;
determine at least one type of an associated natural period of the vessel at the given geographical position; and
compare the geographical position of the vessel and its associated natural period to an expected set of data to provide an indication of a stiffness of the mooring line or a change of the anchor.

* * * * *